No. 858,366. PATENTED JULY 2, 1907.
A. J. BALDWIN.
APPARATUS FOR MAKING WIRE GLASS.
APPLICATION FILED JULY 21, 1905.

2 SHEETS—SHEET 1.

No. 858,366. PATENTED JULY 2, 1907.
A. J. BALDWIN.
APPARATUS FOR MAKING WIRE GLASS.
APPLICATION FILED JULY 21, 1905.

2 SHEETS—SHEET 2.

Witnesses
Raphaël Netter
A. S. Dunham

A. J. Baldwin, Inventor
By his Attorneys
Kerr, Page & Cooper

UNITED STATES PATENT OFFICE.

ARTHUR J. BALDWIN, OF EAST ORANGE, NEW JERSEY.

APPARATUS FOR MAKING WIRE-GLASS.

No. 858,366.   Specification of Letters Patent.   Patented July 2, 1907.

Application filed July 21, 1905. Serial No. 270,603.

*To all whom it may concern:*

Be it known that I, ARTHUR J. BALDWIN, a citizen of the United States, residing at East Orange, in the county of Essex and State of New Jersey, have invented certain new and useful Improvements in Apparatus for Making Wire-Glass, of which the following is a specification, reference being had to the drawings accompanying and forming part of the same.

My invention relates to the manufacture of sheet glass having a reticulated strengthening structure embedded therein, and has for its object to provide an apparatus for producing such glass in a rapid, efficient and economical manner.

Figure 1:
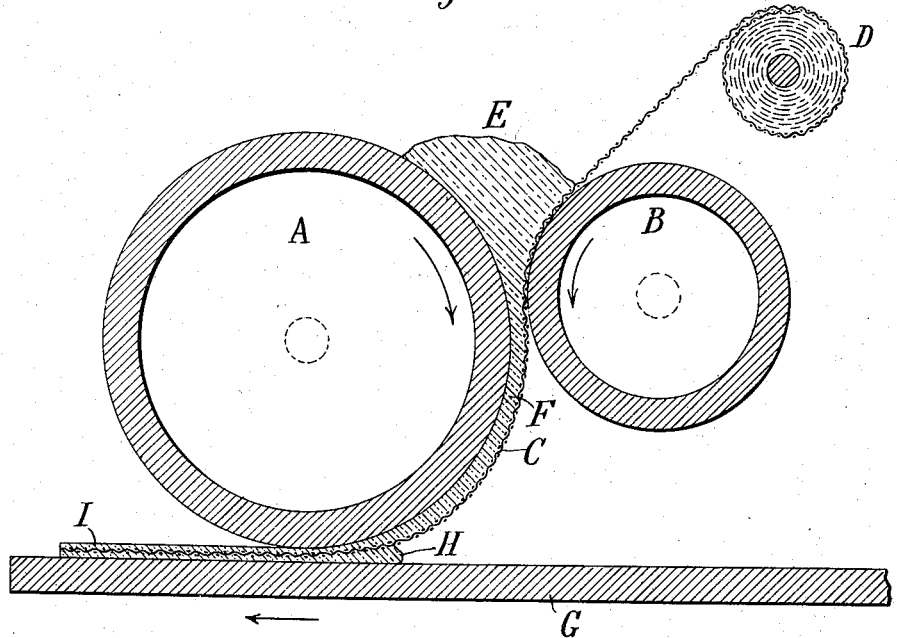
Figure 2:
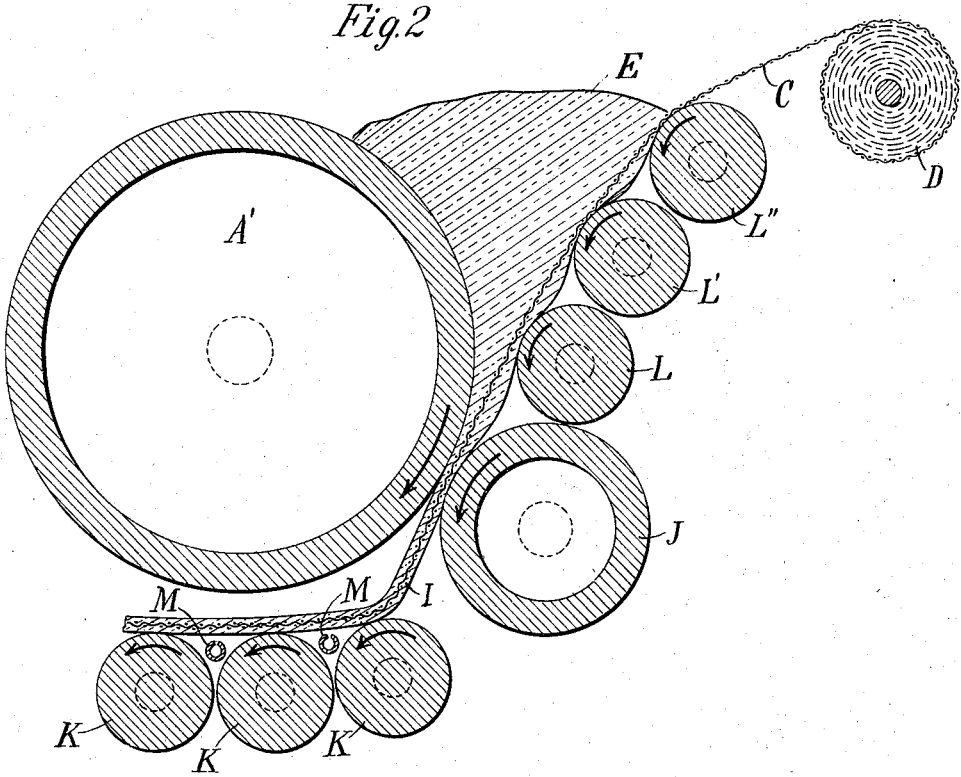
Figure 3:
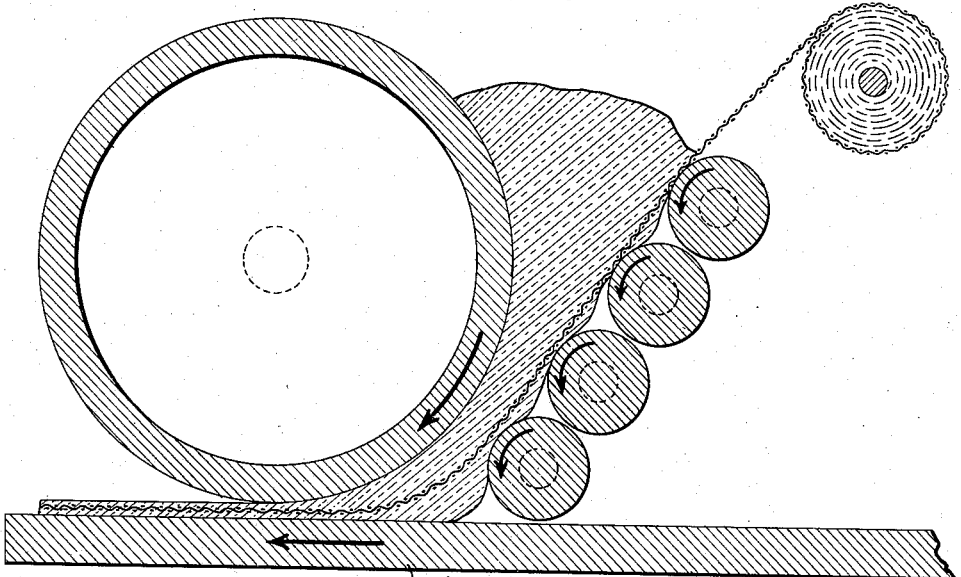

The invention will be more clearly understood when described in connection with the accompanying drawings, in which Figure 1 is a sectional view of the preferred embodiment. Figs. 2 and 3 are sectional views of two other embodiments.

Referring now more particularly to Fig. 1, A and B are co-acting rollers over the latter of which passes a strip of wire meshed fabric C, drawn from any suitable supply thereof, as for example, the roll D. Between the two rollers is deposited a mass of plastic glass E, which, as the rollers revolve in the direction of the arrow, preferably at the same peripheral speed, is rolled or formed into a sheet F, with the wire fabric applied to one side thereof, namely, the outer side. The sheet F is carried downward by the roller A, and strikes a table G, moving in the direction of the arrow at the same lineal speed as the peripheral speed of the roller A. The table and co-operating roller are spaced apart a distance somewhat less than the distance between the sheet forming rollers A and B; consequently as the sheet F passes between the table and its co-operating roller a portion of the glass above the wire fabric is squeezed or forced through the meshes of the latter, forming a small mass of glass H behind the sheet. As the table moves forward this mass of glass H is flattened out into a sheet on the under side of the wire fabric, this operation going on progressively and additions to the mass H being constantly made by the forcing of the glass through the meshes of the fabric in the manner above mentioned. The ultimate product is therefore a sheet of glass I with the wire fabric embedded therein, instead of the wire fabric being applied on one side thereof, as in the case of the preliminary sheet F.

The relative spacing of the rollers A and B, and of the roller A and table G has an important bearing on the operation of the machine. In general I prefer to have the distance between the rollers about twice that between the table G and the roller A. This produces the final sheet with the wire fabric at substantially the center of the same. If the distance between the rollers is less than twice that between the table and its co-acting roller the fabric will be located proportionately nearer the lower surface of the finished sheet, while a greater distance between the rollers will produce the opposite effect, as will be readily understood.

In Fig. 2 is shown an apparatus embodying the same principle as that of Fig. 1, the specific mechanism however being somewhat different. In Fig. 2 the flat table is replaced by a cylindrical table J, which rotates at the same peripheral speed as the large roller A', and it will be clear of course that the two co-operate with substantially the same result. The finished sheet may be received from the roller A' and rolling surface or table J by any suitable devices, as for example, the series of idle rollers K. Of course as many of the latter rollers may be employed as is necessary or desirable. In the machine of Fig. 2 the preliminary sheet is formed by a series of rollers L, L', L''. The first roller L'', serves to carry the wire fabric C downward in contact with the mass of glass E. If the glass E is very plastic it will flow through the meshes of the fabric adjacent the roller L'' and will fall upon the roller L' below or hang from the wire fabric in irregular or convex masses. When the fabric reaches the next roller, L', rotating in the same direction as the one above, the glass which has passed through the fabric is spread over the same in a thin layer. Between the rollers L' and L the same operation occurs, that is, a further amount of glass flows through the fabric, which by the last roller is formed into a thicker layer on the inside thereof. By this time the glass may have become too stiff at that point for any more of it to flow through the fabric, or it may be still soft enough to act in much the same way as between the preceding rollers. In any case, however, the roller J, being spaced from the roller A' less than the other rollers, will have in a greater or less degree an effect similar to that of the table G in Fig. 1, and the wire fabric will be located in its final position in the sheet I.

It will be observed that the rollers J, L, L' and L'' all rotate in the same direction, any suitable mechanism, not shown, being provided for effecting such motion. The rollers are also arranged very closely together, though preferably with sufficient clearness to prevent undue friction or grinding.

The machine shown in Fig. 3 is similar to that of Fig. 2, with the exception that a flat rolling surface or table G' is employed in lieu of the roller J, making the machine more nearly like that shown in Fig. 1.

The machines of Figs. 2 and 3 are specially well adapted for making wire glass by causing glass from the preliminary sheet to pass by the effect of gravity through the meshes of the wire fabric, the glass thus dropping through being spread out in the form of a layer upon the underside of the fabric. It is evident, however, that by having the glass sufficiently plastic in the case of the machine shown in Fig. 1 the same result may be produced. That is, the glass constituting the sheet F will pass partly through the meshes of the fabric C and hang from the same in the form of irregular or convex masses, or it may even fall down upon the table G. In any case it will form part if not all of the mass of glass from which the under layer is formed and applied to the contiguous side of the fabric.

It will be observed that the roller B in Fig. 1, the rollers L, L', L'', and the corresponding rollers in Fig. 3, are spaced from the main roller so as to form with the latter a sort of hopper to receive the pour or batch of molten glass. The effect of the hopper is to cause the pour to spread laterally across the rolls and descend evenly across the apparatus.

A result which has long been desired in this art is the production of wire glass with both surfaces clear and transparent. I have discovered that the flat table on which wire glass is usually formed is responsible largely, if not entirely for the dullness or semi-opaqueness of the contiguous surface of the sheet. It is therefore desirable that in the production of glass for use in places where perfect transparency is required, contact of the sheet with a table be avoided as far as possible. For this purpose the system of receiving rollers K, Fig. 2, will be found of special advantage, since the glass in passing over the same is never in contact with a metallic surface for any considerable time. To avoid any possible sagging of the wire sheet between the receiving rollers, blast pipes, as, for example, M, M', may be provided for discharging a cooling blast of air on the under surface of the sheet, the pipes for that purpose being connected with any suitable source of air under more or less pressure. Such devices may be of any convenient and well known type, and therefore need not be illustrated herein.

It will be understood of course that the three embodiments herein described are not the only ones of which my invention is capable, and that even of those specifically shown, the various details may be widely modified without departure from the proper scope of the invention.

What I claim is:

1. In a machine for making wire glass, the combination of rollers spaced to constitute a hopper and farther apart than the thickness of the finished sheet of glass, and a rolling surface co-operating with one of the rollers and spaced therefrom a distance less than the space between the rollers, as set forth.

2. In a machine for making wire glass, the combination of rollers spaced to constitute a hopper and farther apart than the thickness of the finished sheet of glass, and a rolling surface co-operating with one of the rollers and spaced therefrom a distance equal to the thickness of the finished sheet of glass, as set forth.

3. In a machine for making wire glass, the combination of rollers spaced to constitute a hopper and farther apart than the thickness of the finished sheet of glass, a rolling surface co-operating with one of the rollers and spaced therefrom a distance less than the space between the rollers, and a series of receiving rollers arranged to receive the sheet issuing from between the rolling surface and its co-operating roller and carry the sheet away from the same, as set forth.

4. In a machine for making wire glass sheets, the combination of rollers spaced to constitute a hopper and farther apart than the thickness of the finished sheet of glass, a rolling surface co-operating with one of the rollers and spaced therefrom a distance less than the space between the rollers, a series of receiving rollers arranged to receive the sheet of glass issuing from between the rolling surface and its co-operating roller and carry the sheet away from the same, and means for subjecting the sheet to a cooling agent in its passage over the receiving rollers, as set forth.

ARTHUR J. BALDWIN.

Witnesses:
EDWARD T. MAGOFFIN,
S. S. DUNHAM.